Figure 1:
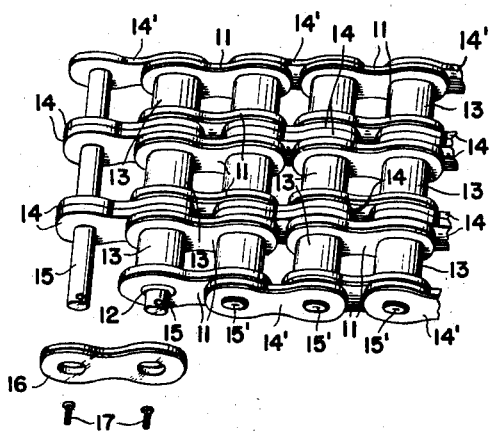

Jan. 20, 1959 B. WELSER 2,869,379
CHAIN SIDEPLATE CONSTRUCTION
Filed Aug. 4, 1954

BRINTON WELSER
*INVENTOR.*

BY George A. Evans
*ATTORNEY*

United States Patent Office 2,869,379
Patented Jan. 20, 1959

2,869,379

CHAIN SIDEPLATE CONSTRUCTION

Brinton Welser, Milwaukee, Wis., assignor to Chain Belt Company, Milwaukee, Wis., a corporation of Wisconsin Application August 4, 1954, Serial No. 447,775

8 Claims. (Cl. 74—245)

This invention relates to improvement in the construction of apertures in the center plates of multiple strand sprocket chain and in the engagement they make with connecting pins extending through the several strands.

Multiple strand roller chain consists essentially of several strands of conventional roller chain arranged side by side but with single pins extending through both the aligned bushing apertures of the strands as well as the apertures in the overlapping portions of the connecting pin plates. Thus each strand consists of the conventional arrangement of alternating bushing and pin links and the ultimate strength and rating of multiple strand chain is a multiple of that of a single strand, the multiplier being substantially the number of strands so assembled. The outer pin links of a multiple strand chain are generally referred to as the cap plates and the pin links between the several strands of the chain are generally referred to as spacer plates.

An advantage of multiple strand chain over larger pitch heavier single strand chain but of equivalent total strength resides in greater speed capacity. The multiplicity of shorter pitch chains are able to travel effectively at greater linear speeds over sprockets of like diameter. When the multiple strands are interconnected by common through pins, smoother operation is promoted and vibration is dampened which would otherwise appear in a series of corresponding chains mechanically independent of each other. Problems however have existed in the utilization of the through connecting pins.

It is, of course, essential that the pins be prevented from turning in the connecting pin plates of single or multiple strand chain and this is generally accomplished by employing a relatively high press fit between the two outside pin plates and the pins which extend through the circular apertures in these plates. The degree of fit of the pins in the apertures of the intermediate or spacer pin plates of multiple strand chain has been a subject of wide divergence of opinion, for the reason that loose fits enable more ready original assembly as well as disassembly and re-assembly of the chain as it is installed, but at the same time loose fits permit play between the pins and plates, and promote wear and/or "Brinelling," fretting and fatigue failure.

It is an object of this invention to provide a construction of multiple strand chain, in which through a unique design of pin plate apertures, it is possible to produce a chain (a) having advantageous endurance limits, (b) that can be easily assembled or disassembled in the field without special tools, (c) that will avoid wearing and/or "Brinelling" of sideplates caused by loose fits, and (d) that can be manufactured without substantial addition to cost.

According to the present invention, the apertures in the interior connecting plates are made of "ovoid" or egg shape instead of circular, as in conventional construction, with the narrowing end approach of the apertures establishing dimensions transverse to the length of the plates. Furthermore the narrower end approaches point toward the center of the plates while the connecting pins, which are circular in cross section, are of a diameter slightly greater than the distance across the narrower approach portion of the apertures to produce non-uniform interference which causes the pins to be forced and held against the outer ends of the apertures and maintains desirable dead bearing pressure between the contacting surfaces.

The radii of the portion of the spical apertures along the pitch line of the chain, i. e. parallel to the length of the link, are greater than the radii of the portion of the aperture at right angles thereto, and preferably the pitch line aperture dimension is either slightly greater than the diameter of the pin or approximately equal to it. As a result, there is less pressure between the parts, and less force is required to insert and/or remove the pin through the aperture than if there were uniform interference between the aperture and the entire circumference of the pin.

The interference between the pin and the dimension of the aperture normal to the pitch line of itself creates compressive stresses in the metal of the sideplates adjacent the aperture in the regions subjected to the greatest stress, where fatigue failures are most apt to occur. Thus the fatigue strength of the sideplates is maintained substantially comparable to that of a full interference fit.

By reducing interference or having clearance along the pitch line, manufacturing variations in pitch, i. e., in the distance between the centers of the apertures of the various plates that are connected by the same set of through pins, produces less pin tightness because the pin does not have to deflect along itse axis to accommodate itself in holes that are not perfectly aligned, which tightness is particularly accentuated by those plates that are immediately adjacent each other. As a further result, in addition to reduction of this "corkscrewing" effect, there is less "cocking" of the spacer pin plates on account of pitch variation during field assembly, and the plates are more readily maintained in parallel relation to each other.

Figure 3:
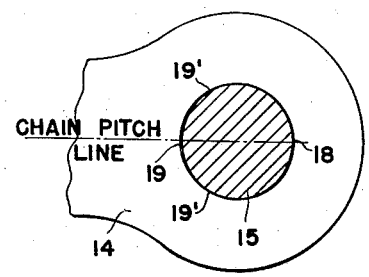
Figure 2:
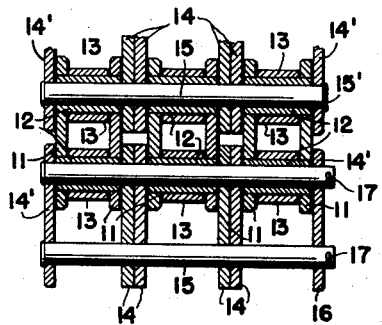
Figure 5:
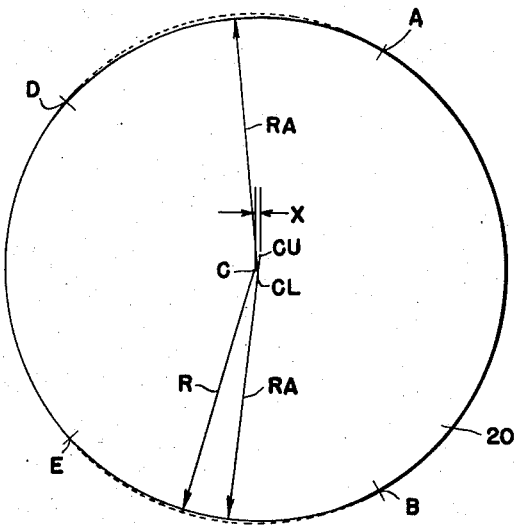
Figure 4:
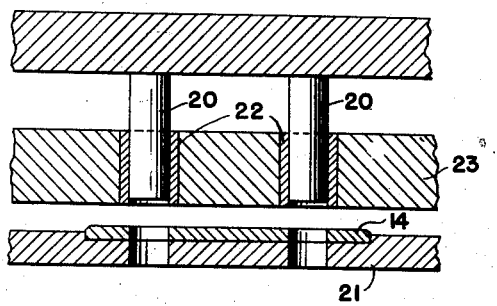

The invention can best be described by reference to the accompanying drawings, in certain views of which dimensions are somewhat exaggerated to depict the features of construction involved. In the drawings:

Fig. 1 is a partially exploded perspective view of a portion of a multiple strand roller chain in which the invention is incorporated; Fig. 2 is a plan view of such chain taken in section through the centers of the connecting pins; Fig. 3 is an enlarged side elevation showing the connection between the pin and spacer pin plate; Fig. 4 is a vertical section showing the guided punches for producing the sideplate ovoid apertures; and Fig. 5 is an enlarged end view of one of the punches shown in Fig. 4.

The chain shown in Figs. 1 and 2 consists of an assembly of roller links, pin or connecting plates and connecting pins. Each roller link consists of side plates 11 connected by bushings 12, which are press fitted into apertures in the ends of the side plates. Enclosing the bushings 12 are rollers 13 which, of course, are free to roll on the bushings and which have slight end clearance between the side plates 11.

The pin plates 14 are usually of similar "dumbbell" or figure 8 configuration as the bushing plates 11, and they are provided with apertures through which the pins 15 extend. The plates are arranged so that there are two connecting pin or spacer plates 14 between each bushing link and a single pin or cap plate 14' on the outer ends of each of the pins. The pins 15 are free to turn in the bushings 12 as the chain is flexed over the sprockets, the teeth of which engage the rollers 13. The apertures in the cap plates 14' are fully circular and of less diameter than that of the pins 15 so that with a heavy press fit between the cap plates and the pins, the pins are effectively kept from turning in the plates. To prevent endwise displacement of the pins, their ends may be riveted as at 15' or otherwise held in place.

The chains are usually shipped as strands with bushing links at one end and connector plates at the other end of the strand. The connector plate 16 is held in position by riveted ends, cotters or spring clips. In Fig. 1, there is illustrated a pair of cotters 17 which extend through apertures in the ends of the pins 15 just outside the cap plate. If there are an odd number of links in the chain, an offset connector link is employed requiring only one connector pin. Variations in the form of pin retainers are well known in the art.

Instead of making the apertures in the interior pin plates 14 of round configuration, those of this invention are what will be termed of "ovoid" shape, i. e., they are egg shaped with the narrowing approach portion being on the side of the aperture closest to the center of the link. The dimension of the aperture portion on the pitch line of the link is preferably at least as great or slightly greater than the diameter of the connecting pin, whereas the dimension of the portion of the aperture normal thereto is less than that of the pin. By making the aperture ovoid rather than a true ellipse, with the narrowing portion toward the center of the link, the pin is held against the outer or dead bearing end of the aperture and in combination with the gripping of the aperture on the pin normal to the pitch line, fretting, wear and/or "Brinelling" is avoided.

The resulting construction is illustrated in Fig. 3 showing the pin 15 contacting the outer or bearing end 18 of the aperture in the spacer plate 14. As shown, there is slight clearance 19 between the inner end of the hole and the pin resulting from the crowding effect of the interference between the sides 19' of the hole inward of the center of the pin as depicted in said figure.

The actual configuration of the aperture can perhaps best be described by the method in which it is made, and which is illustrated in Fig. 4. For simplicity in manufacture, initially round holes may be punched in the side plates 14 slightly smaller in diameter than the ultimate desired, after which the holes are repierced with shaving punches 20 having the unique configuration desired. In Fig. 4, the plate 14 is held in a suitable fixture 21 and the two punches 20 are guided through the bushings 22 in the stripper 23, so that accurate spacing and location of the holes is obtained.

The use of the guiding stripper plate 23 is an important factor in reducing variation in the pitch of various plates, because without being guided, the punches have a tendency to "wander" on account of their unusual shape. If only the working end of each punch is made of the ultimate "ovoid" configuration, for a distance slightly more than the thickness of the side plate 14, and the remaining upper portion if fully round, the punch may repierce and overtravel and still be fully guided in the circular interior of the bushings 22 of the guiding stripper.

In Fig. 5 there is shown a cross section of the end of one of the punches which has a portion of its outer surface ground off by moving the center about which the grinder is swung to the positions indicated CU and CL for the respective grinding operations on each side of the punch. The original true circular shape of the punch is indicated by the dotted lines in Fig. 5, concentric about the center C.

The dimensions of the punch 20 may vary slightly from the dimensions of the final hole because after removal of the punch and hardening of the side plate, there is usually a slight shrinkage of the hole size. To compensate for the above, for instance with multiple width No. 100 roller chain, which will be referred to in all the examples hereafter given, this shrinkage may be slightly in excess of .001 inch across the various diameters. The alteration in hole size following punching may very depending on type of steel used, side plate thickness, etc., but can be determined in any event and allowance made therefor.

In practice only a small amount of metal is actually removed from the indicated portions of the punch 20 by the offset grinding operation. For a punch diameter in the range of .3753", the centers CU and CL have been found to be moved only from .001" to .003" back (the dimension X) from the geometrical center C of the punch. The radii RA are such as to intersect the punch circumference as indicated at the points A, B, D and E and produce the desired interference between the pin and aperture on the sides of the aperture.

When a punch is formed in this manner and employed in the tool shown in Fig. 4, it will produce the apertures of the desired configuration in the plates 14.

With the illustration given above, if the normal pin diameter is .375", this pin when pressed into such an aperture will preferably have a slight clearance on the side of the pin (19) (see Fig. 3) nearest the center of the link. Along its side portions 19', the aperture dimension provides a definite interference between the aperture and the pin. The greatest interference being on the sides of the aperture tapering inward toward the center of the link, the pin is held against the outer or bearing end of the aperture as illustrated in Fig. 3.

In instances it may be desirable to cold work in its final condition the metal surrounding the ovoid aperture such as by drifting the holes with ovoid or round shaped drifting tools, or forcing steel balls through the aperture, in either event to expand the metal beyond its elastic limit and create permanently residual compressive stresses. Such favoring stresses are similar to those caused by the interference of the pin with the hole in that they both resist the fatiguing action of tensile stresses under cyclic loads.

It is possible to use round expanding tools on ovoid shaped holes without losing the ovoid shape characteristic, and in such cases as well as those in which ovoid expanding tools are employed, the holes must initially be made smaller so that after expansion has occurred, the desired amount of clearance and interference with the pins will be obtained.

Since the metal surrounding the opening grips the pin substantially only on the sides, it is easier to displace the pin endwise as in assembly, disassembly or reassembly of the chain. The gripping action, however, is sufficient to prevent the pin from moving relative to the aperture and causing enlargement due to fretting, wear and/or "Brinelling" of the metal as a result of movement.

Referring again to Fig. 5, the solid line indicates the hole outline as well as the end of the punch, and the arcs AB and DE represent the end portions of the punch (and the hole as well) which are true arcs of the same circle. In the illustration given, the arc AB is greater than 90° and preferably of the order of approximately 120°, while the arc DE is less than 90° and preferably of the order of 80° or slightly less. Preferably arcs AD and BE are arcs of a circle having the same radii, but are not arcs of the same circle. The maximum interference between the pin and aperture is somewhat back toward the center of the link from a line normal to the pitch line of the chain. This tapering of the sides of the hole toward the center of the link insures that the pin contacts the outer or dead bearing end of the hole upon assembly and thereafter.

Although dimensional details and a preferred mode of construction have been set forth herein to disclose a practical and useful embodiment of the invention, it is understood that various other dimensional and proportional relationships as well as different constructions may be utilized without departing from the spirit and scope of the invention as defined in the sub-joined claims.

An exemplary embodiment of the invention having been described, what is claimed is:

1. A connection between a pin spacer plate and a pin in a multiple strand roller chain comprising a plate having an ovoid aperture near one end of the plate with its narrower end pointing toward the center of the plate and a pin of circular cross section extending through the aperture, said pin having a diameter greater than the smaller transverse dimensions of the aperture as formed in the plate, whereby the pin is principally gripped so as to be forced toward the larger end of the aperture and confined so that the pin when assembled in an adjacent plate having slightly greater or less pitch is more readily accommodated without severe binding against the outer end of the aperture.

2. A pin plate for multiple strand chain having apertures for a connecting pin adjacent each end thereof, at least one of said apertures having inner and outer ends respecting the plate and at the pitch line thereof, said ends being arcs of the same circle while its sides are arcs of greater circles intersecting said ends and swung from points back and beyond the geometric center of the aperture and offset with respect to said pitch line, whereby said aperture is of generally ovoid shape with its narrower portions pointing toward the center of the link.

3. A pin plate according to claim 2 in which the circular arc at the outer, bearing end of the apertures exceeds 90° while the circular arc at the inner, opposite end of the aperture is less than 90°.

4. A pin plate according to claim 2 in which the dimension of the aperture along the pitch line of the chain is at least as great as the diameter of the pin to be inserted therein.

5. In a multiple strand chain including laterally-spaced links, connecting pins of circular cross-section and turnable in said links, and adjacent pairs of spacer plates assembled on said pins between said links, each spacer plate having an ovoid hole at one end of the plate with the smaller end of the ovoid disposed toward the center of the plate and with the flatter parts of the ovoid arranged to interfere with the pin to provide firm securement of the pin and to force the pin against the larger end of the ovoid but with considerably less force than is exerted normal to the pitch line, the smaller end of the ovoid being relatively without stress to allow the pin to be inserted or removed from the hole with appreciably less force than is required with a round pin fitted in a round hole with an equivalent interference normal to the pitch line, and so that differences in the pitch of assembled pairs of adjacent plates, within limits corresponding to normal manufacturing tolerances, are more readily accommodated to allow insertion and removal of the respective pins as for installation and replacement of the chain.

6. A spacer plate for assembly in pairs between laterally-spaced links of a multiple-strand chain including pins of substantially circular cross-section and on which said links are turnable, said plate to be mounted on said pins with an interference fit between the pin and plate sufficient for securement of the pin and plate against relative movement in normal chain service but not so great as to prevent disassembly of the pin and plate with reasonable effort, the improvement characterized by an irregularly shaped hole of dimensions providing three separate areas of principal engagement of the pin and plate and three areas of nominal engagement of the pin and plate, said last named areas allowing the strain set up in said areas of principal engagement by such assembly to extend into said areas of nominal engagement and said interference fit to be thereby more readily effected, one of said separate areas of principal engagement being the load bearing area whereby said securement of the pin is unaffected by normal chain loading.

7. In a multiple-strand chain comprising links having pitched holes, pins of substantially circular cross-section and extending through said holes and turnable therein, cap plates firmly secured to the ends of said pins and spacer plates having pitched holes, said spacer plates being assembled on said pins in pairs between laterally-spaced links, said chain including pairs of said spacer plates having holes of approximately the same pitch and other pairs of said spacer plates having holes of respectively greater and lesser pitch to the extent of the differences in pitch allowed in the manufacture thereof; the improvement characterized by the formation of said holes of said spacer plates prior to assembly of said plates and wherein each hole is of an ovoid shape with the smaller end thereof disposed toward the center of the plate and opposite the larger load-bearing end of the hole, and wherein each hole is dimensioned to receive the pin with a given minimum interference fit, said pairs of spacer plates having holes of substantially the same pitch being assembled with the pins wedged between the flatter parts of the holes of both plates of said pairs and secured against the load-bearing ends of the holes of both plates of said pairs, said pairs of spacer plates having holes of different pitch being assembled with the pins wedged between the flatter parts of the holes having the greater pitch and secured against the load-bearing ends of the holes having the lesser pitch.

8. In a multiple-strand chain including laterally-spaced links, pins of substantially circular cross-section extending through and turnable in said links, and cap plates fixed on the ends of said pins: spacer plates having pitched holes of an ovoid shape as formed therein prior to their assembly on said pins, each said hole having the smaller end of the ovoid disposed toward the center of the plate and opposite the larger load-bearing end of the hole, each said hole being dimensioned to receive a pin with an interference fit for principal engagement with the pin along the flatter parts of the hole and the load-bearing end of the hole, said spacer plates being assembled on said pins in pairs between laterally-spaced links of said chain with an area of relief between each pin and plate at the smaller end of the hole and with areas of relief lying between said flatter parts of the hole and the load-bearing end of the hole, said areas of relief being effective to reduce the interference fit between pins and pairs of plates having holes with differences in pitch normally occurring in manufacture.

References Cited in the file of this patent

UNITED STATES PATENTS

| | | |
|---|---|---|
| 1,877,339 | Kottlowski | Sept. 13, 1932 |
| 2,231,213 | Mize | Feb. 11, 1941 |
| 2,424,087 | Focke et al. | July 15, 1947 |
| 2,667,791 | Bremer | Feb. 2, 1954 |

FOREIGN PATENTS

| | | |
|---|---|---|
| 19,378 | Great Britain | 1912 |